June 6, 1961 L. O. REICHELT ET AL 2,986,866

REEL SUPPORTING AND POSITIONING MECHANISM FOR CABLE-STRANDING APPARATUS

Filed July 10, 1959 3 Sheets-Sheet 1

INVENTORS
L. O. REICHELT
D. V. WATERS
BY a. C. Schwarz, Jr.
ATTORNEY

June 6, 1961 L. O. REICHELT ET AL 2,986,866

REEL SUPPORTING AND POSITIONING MECHANISM FOR CABLE-STRANDING APPARATUS

Filed July 10, 1959 3 Sheets-Sheet 2

INVENTORS
L. O. REICHELT
D. V. WATERS
BY
a. C. Schwarz, Jr.
ATTORNEY

INVENTORS
L.O. REICHELT
D.V. WATERS
BY A.C. Schwarz, Jr.
ATTORNEY

United States Patent Office 2,986,866
Patented June 6, 1961

2,986,866

REEL SUPPORTING AND POSITIONING MECHANISM FOR CABLE-STRANDING APPARATUS

Lester O. Reichelt, Downers Grove, Ill., and Daniel V. Waters, Lebanon, N.J., assignors, by direct and mesne assignments, to Western Electric Company, Incorporated, New York, N.Y., a corporation of New York Filed July 10, 1959, Ser. No. 826,226
8 Claims. (Cl. 57—66.5)

This invention relates to reel supporting and positioning mechanism for cable-stranding apparatus and more particularly to mechanism for locating and supporting a reel and reel truck unit on a rotatable cradle of the apparatus.

An object of the present invention is to provide an improved reel supporting and positioning mechanism for a cable-stranding apparatus.

A further object of the invention is the provision of mechanism for locating and supporting a reel and reel truck unit on a rotatable cradle of a cable-stranding apparatus.

Another object of the invention is to provide a reel and reel truck unit in which the reel is rotatably mounted on the reel truck and is supported on the reel truck when the unit is removed from the cradle and in which the reel is adapted to be raised slightly on the reel truck when the unit is mounted on the cradle to take the axial thrust of the reel off of the truck.

A further object of the invention is the provision of a device on the cradle cooperable with the reel and reel truck unit for supporting the reel truck in a predetermined position to be clamped to the cradle and for supporting the reel for rotation in slightly raised position relative to the truck with the weight of the reel removed from the truck.

Another object of the invention is to provide a device on the cradle of the cable-stranding apparatus for supporting the reel and reel truck unit and which device is operable during the loading of the unit onto the carrier to guide a lift truck with the reel and reel truck unit thereon along a definite path and to stop it in a predetermined position to locate the reel and reel truck unit in its proper position on the carrier.

A cable-stranding apparatus illustrating certain aspects of the invention may include a rotatable cradle for supporting a reel and a reel truck which cooperate to form a reel and reel truck unit. The reel on which the cable is wound has a shaft extending from the lower end thereof which is slidably and rotatably mounted in and extends through a vertically disposed bearing on the reel truck which supports the reel when the reel and reel truck unit is removed from the cradle. The reel and reel truck unit is loaded onto and removed from the cradle through side openings therein by means of a lift truck having a fork, which fits under the reel truck and supports the reel and reel truck unit during transportation thereof to and from the cradle. A positioning and supporting device on the cradle is adapted to fit between and cooperate with the fork of the lift truck to guide the lift truck with the reel and reel truck unit thereon along a definite path and to stop the lift truck in a predetermined position with the reel and reel truck unit disposed in its proper position on the carrier. The positioning and supporting device has an upper surface engageable with the bottom of the reel truck for supporting the reel truck, and the device has a rotatable bearing for receiving the end of the reel shaft to support it for rotation and to raise the reel slightly upwardly relative to the truck to take the weight of the reel off of the truck. A bumper on the positioning and supporting device engages a transverse portion of the fork of the lift truck to absorb the impact thereof during the loading of the reel and reel truck unit onto the carrier.

Other objects and advantages of the invention will become apparent by reference to the following description and the accompanying drawings illustrating a preferred embodiment thereof, in which.

Figure 1:
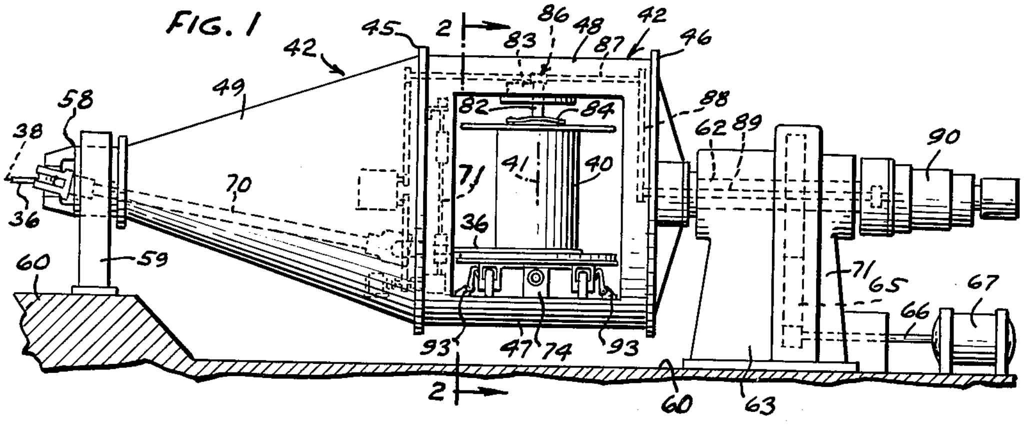
FIG. 1 is a fragmentary elevational sectional view of the cable-stranding apparatus showing the improved reel and reel truck unit and the device for positioning the unit on the apparatus.

In the present apparatus, a cable 36 (FIG. 1) is formed from a plurality of insulated conductors along a substantially horizontal axis 38 and is wound onto a take-up reel 40. This reel is supported in a cradle 42 for rotation about the reel axis 41 to wind the cable thereon and is supported for turning movement with the cradle about the horizontal axis 38 to twist the cable.

The cradle 42 is a hollow structural shell having a pair of circular vertically disposed walls 45 and 46 and a pair of horizontal parallel frame members 47 and 48 extending between the walls 45 and 46 for receiving the reel 40 therebetween. The lower frame member 47 forms a platform on which the reel 40 is supported when the cradle is in loading position. A tapering end portion 49 extends from the plate 45 and has a hollow journal 58 secured thereto which is rotatably supported in a pedestal 59 mounted on a base 60. A hollow journal 62 fixed to the frame plate 46 of the cradle is rotatably supported in a pedestal 63 on the base 60 and is connected through a train of gears 65 and a drive shaft 66 to a driving motor 67 by means of which the cradle 42 and the cable take-up reel 40 are rotated about the horizontal axis 38.

The base 60 has a pit formed therein for receiving a portion of the cradle 42, the upper surface of the base 60 being substantially flush with the upper surface of the platform 47 of the cradle when the cradle is in its loading position to permit the loading of an empty reel 40 onto the cradle 42 and the removal of a full reel therefrom from either side of the cradle through the two side openings therein. As the cable 36 moves into the cradle 42, it enters a movable composite guide tube 70 which is swivelly connected at one end to the hollow journal 58 and is pivotally connected at its other end to a distributing member of a distributing mechanism 71 for guiding the cable evenly onto the reel 40 in successive layers.

The reel 40 is rotatably and permanently mounted on a truck 72 (FIG. 3) which cooperates with the reel 40 to form a reel and reel truck unit 73 and which supports the reel 40 when the reel and reel truck unit 73 is removed from the cradle 42. When the reel and reel truck unit is in the cradle 42, the reel 40 and the truck 72 are supported on a positioning device 74 which is fixed to the platform 47 of the cradle 42 and has a rotatable thrust bearing 75 provided with a tapered socket 76 adapted to receive the projecting tapering end 77 of a stub shaft 78 on the lower end of the reel 40.

Figure 2:
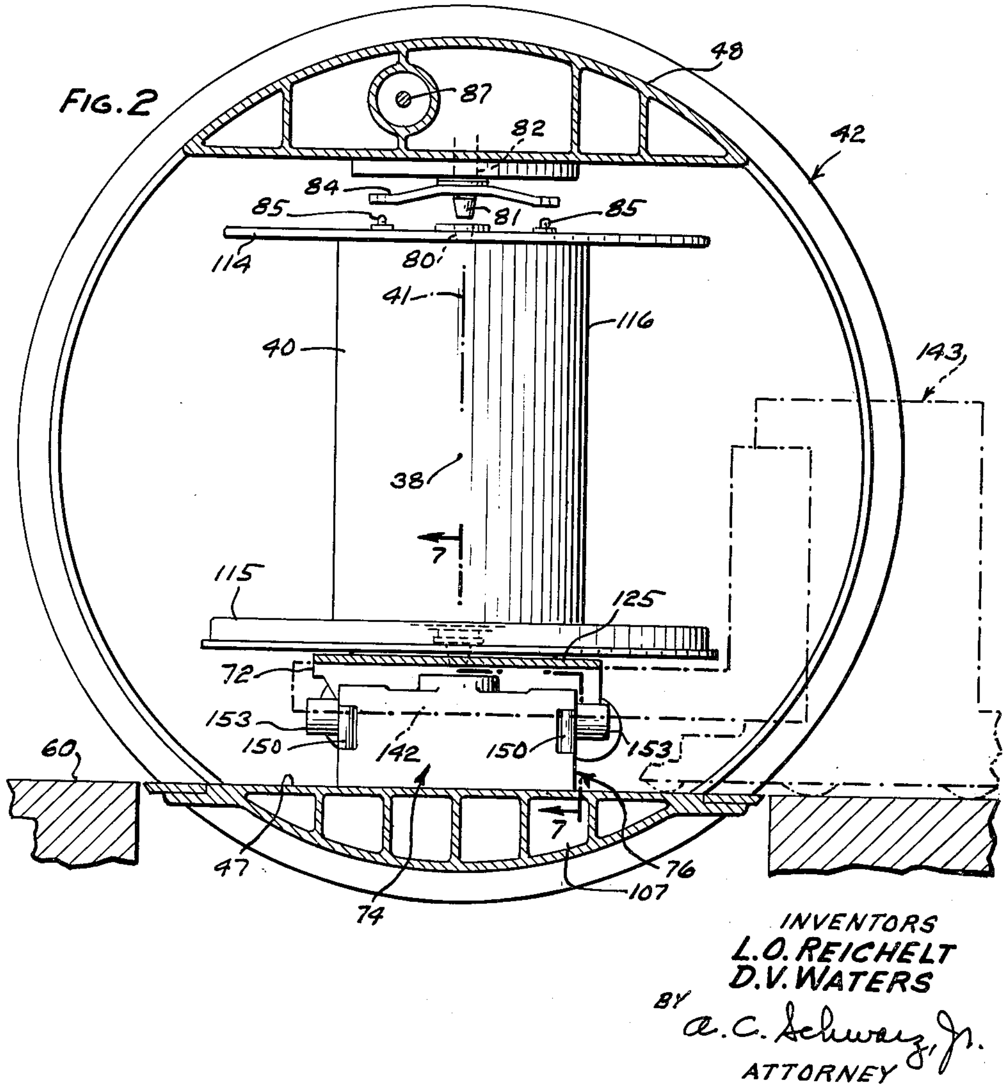
FIG. 2 is an enlarged vertical cross-sectional view of the apparatus taken on the line 2—2 of FIG. 1 and showing the reel and reel truck unit in a raised position in the apparatus as it is being carried onto the apparatus on a lift truck which is indicated in dotted lines.

The upper end of the reel 40 has a socket 80 (FIG. 2) for receiving the tapering end 81 of a reel centering and clamping shaft 82 (FIG. 1) which is rotatably mounted on the cradle 42 and is actuated axially into engagement with the reel by a reel-clamping mechanism 83 for clamping the reel against the positioning device 74 and for cooperating with the device 74 to center and support the reel 40 for rotation. The reel centering and clamping shaft 82 has a cross arm 84 engageable with pins 85 on the reel 40 to establish a driving connection with the reel. The shaft 82 is connected through suitable gearing 86, a shaft 87, a chain and sprocket connection 88 to a drive shaft 89 which is supported in the hollow journal 62 and is connected to a motor 90. The motor 90 is mounted onto the end of the hollow journal 62 for rotation with the cradle 42 and serves to rotate the reel 40 and to drive the distributing mechanism 71.

The reel truck 72 is adapted to be securely clamped to the device 74 and the cradle 42 for rotation with the cradle by a reel-truck clamping mechanism 93 disclosed in co-pending application Serial No. 826,224, filed July 10, 1959.

The reel 40 (FIGS. 2 and 3) have upper and lower heads 114 and 115 which are interconnected by a drum 116 and a tube 117, the upper head 114 having the socket 80 therein for receiving the tapered end 81 of the reel centering and clamping shaft 82 and the lower head 115 having an upwardly directed conical portion 122 and a hub 123 with the stub shaft 78 fixedly secured therein. A portion of the stub shaft 78 extends downwardly through a hub 124 of the reel truck 72 which hub extends upwardly from a horizontal frame plate 125 of the reel truck 72. A pair of fixed rollers 126 and a pair of caster rollers 127 are mounted on the reel truck frame 125 for supporting it for rolling movement outside of the cradle 42.

Figure 3:
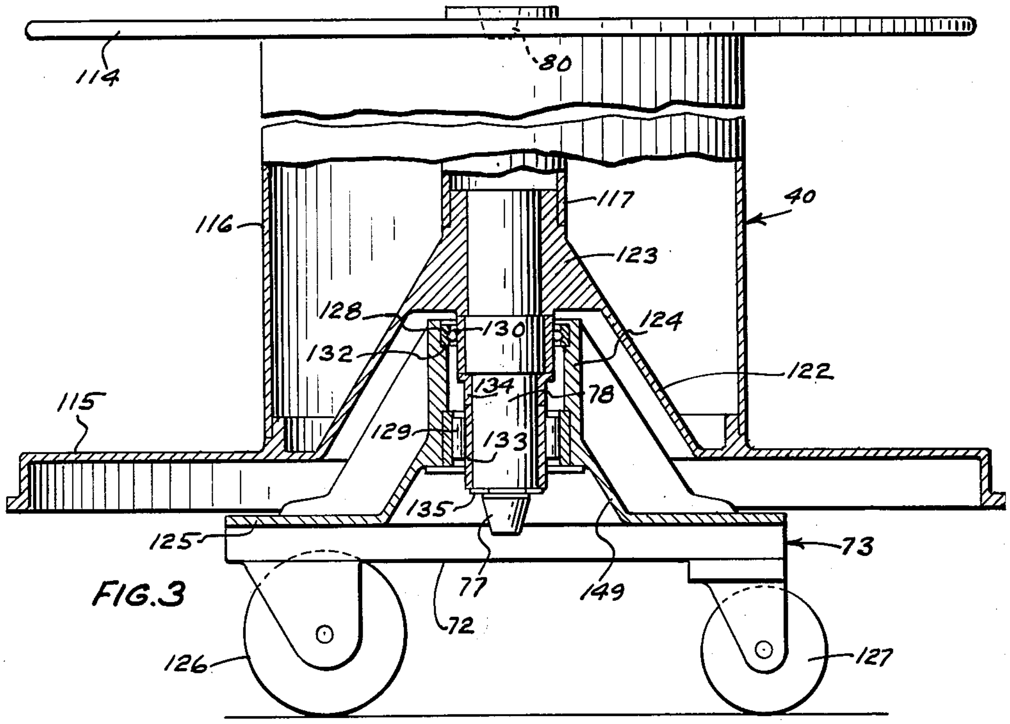
FIG. 3 is an enlarged fragmentary elevational sectional view of the reel and reel truck unit removed from the apparatus.

A ball bearing 128 slidably mounted in the upper portion of the hub 124 on the truck frame 125 and a roller bearing 129 fixedly mounted on the lower end of the hub 124 engage the stub shaft 78 and support the reel 40 for rotation about its axis. The downward thrust of the reel is carried by the upper bearing 128, the inner race 130 of which engages the hub 123 of the lower reel head 115 and the outer race of which is slidably mounted for limited vertical movement in the hub 124 and normally rests on a shoulder 132 thereof (FIG. 3). The inner race 130 of the upper bearing 128 and the inner race 133 of the lower bearing 129 are secured to the shaft 78 together with a spacing sleeve 134 by a split locking ring 135 fitting in a groove in the shaft.

Figures 5, 6, 7:
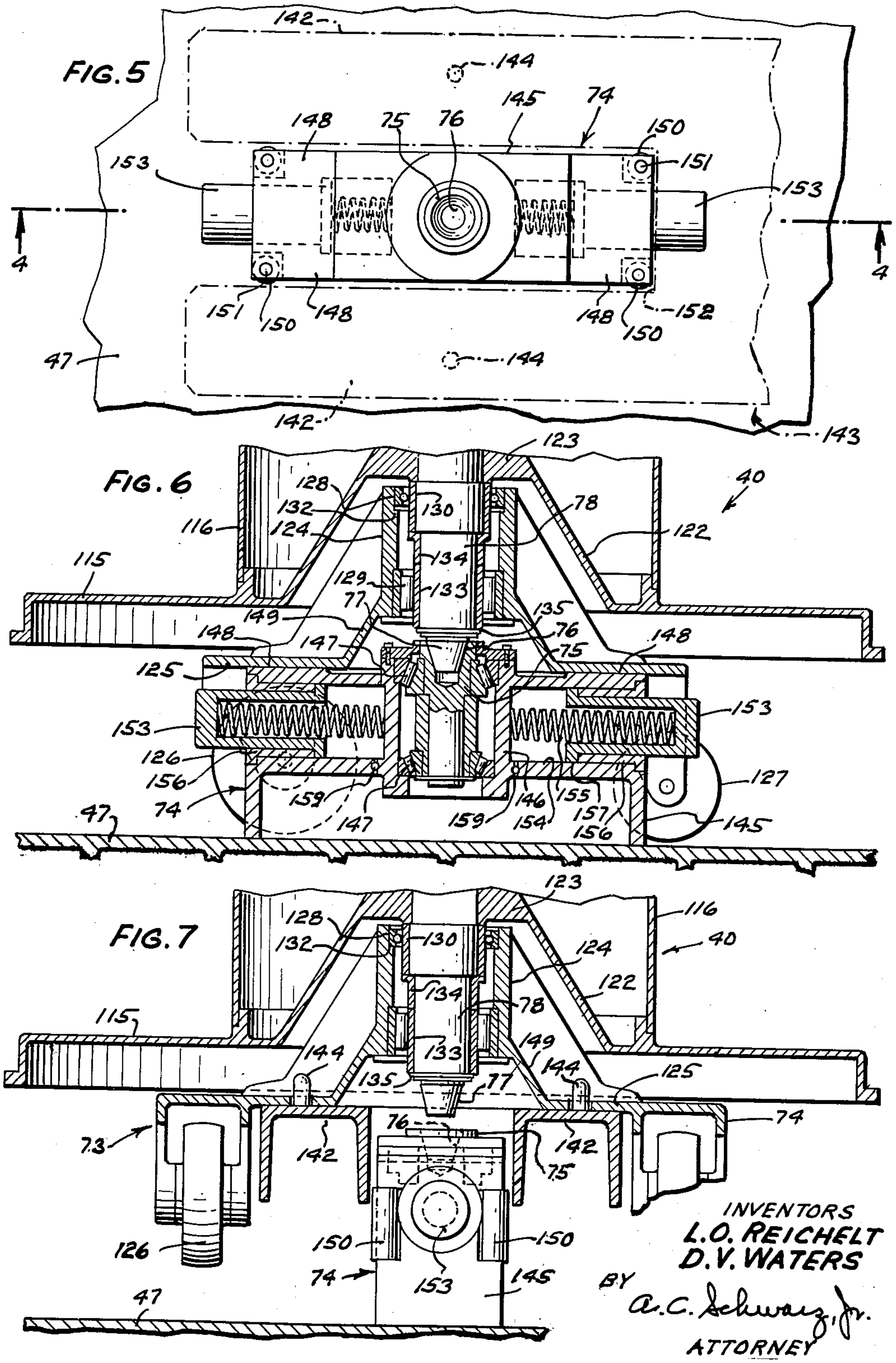
FIG. 5 is a fragmentary plan view of the apparatus showing the device for supporting and locating the reel and reel truck unit and showing in dotted lines the fork of the lift truck used for transporting the reel and reel truck unit.
FIG. 6 is a fragmentary vertical sectional view similar to FIG. 4 showing the reel and reel truck unit supported on the reel locating and supporting device.
FIG. 7 is a fragmentary vertical elevational sectional view of the apparatus taken on line 7—7 of FIG. 2 and showing the reel and reel truck unit supported on a lift truck above the reel-locating device.

This construction is such that the reel 40 and the reel truck 72 are capable of limited axial movement relative to each other which permits the weight of the reel 40 to be supported by the reel truck 72 and the upper thrust bearing 128 when the reel and reel truck unit 73 is removed from the cradle 42 (FIG. 3) and permits the reel 40 to be raised slightly by the thrust bearing 75 and the weight of the reel 40 to be transferred from the reel truck 72 onto the rotatable thrust bearing 75 on the positioning device 74 of the cradle 42, and also permits the reel truck 72 to be clamped onto the positioning device 74 when the reel 40 and the reel truck 72 are placed on the cradle as shown in FIG. 6.

During transportation to and from the cradle 42, the reel and reel truck unit 73 is carried by the fork 142 of a lift truck or vehicle 143 (FIGS. 2, 5 and 7), the arms of the fork engaging the underside of the horizontal frame plate 125 of the reel truck 72. Pins 144 on the fork 142 fit into apertures in the reel truck frame 125 and locate the reel and reel truck unit 73 in a predetermined position on the fork 142. The positioning device 74 is designed to fit between the arms of the fork 142 of the lift truck and aid in guiding the lift truck with the reel and reel truck unit 73 thereon onto the cradle 42 and into loading position with the stub shaft 78 of the reel vertically aligned with the rotatable thrust bearing 75 of the reel-positioning device 74.

The device 74 comprises a hollow rectangular block 145 (FIGS. 4, 5 and 6) which is fixedly secured to the platform 47 of the cradle 42 by any suitable means and is provided with a vertically disposed annular hub 146 for receiving the rotatable thrust bearing member 75. A pair of tapered roller bearings 147, 147 mounted in the hub 146 supports the thrust bearing 75 on the block 145 for rotation about a vertical axis and against axial displacement. The upper portion of the hub 146 and the thrust bearing 75 project above the upper flat surfaces 148, 148 of the block 145 and fit in a recess in the reel truck 72 formed by the sloping walls 149 of the reel truck between the hub 124 and the horizontal frame plate 125 thereof when the reel and reel truck unit 73 is mounted on the cradle 42.

As viewed from above (FIG. 5), the positioning device 74 is elongated and has rollers 150 which are mounted in recesses at the corners of the block 145 for rotation about vertical pins 151 secured in the block. Thus, as the lift truck 143 is actuated to load the reel and reel truck unit 73 onto the cradle 42, the fork 142 of the lift truck will straddle the positioning device 74 and engage the rollers 150 on opposite sides thereof and be guided thereby along a predetermined path, and a cross member 152 on the fork of the lift truck 143 will engage the end of the positioning device 74 and the lift truck will be stopped thereby in a position with the reel 40 and the stub shaft 78 thereof disposed above and in substantial alignment with the rotatable thrust bearing 75.

Figure 4:
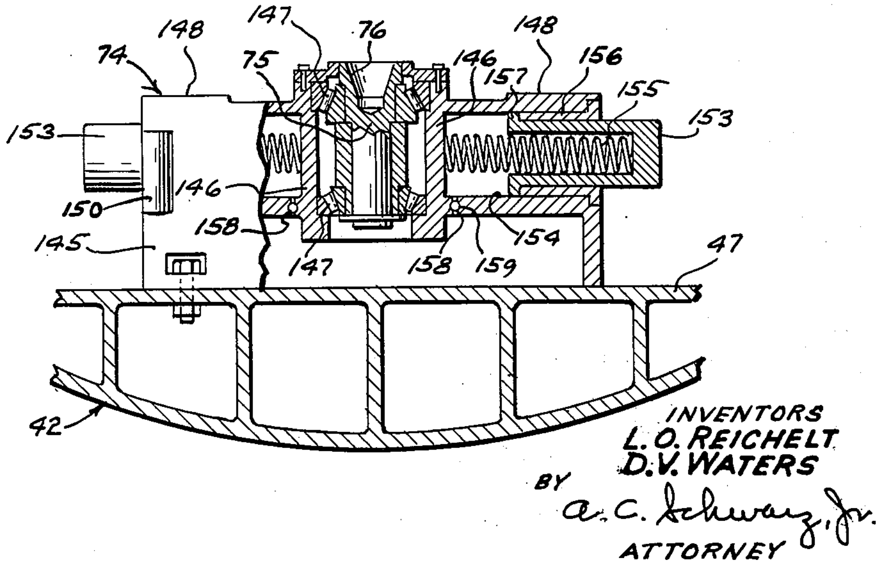
FIG. 4 is a fragmentary vertical cross-sectional view of the apparatus taken on line 4—4 of FIG. 5 and showing the device for supporting and locating the reel and reel truck unit on the apparatus.

Two buffers 153 are mounted on opposite ends of the positioning block 74 for absorbing the impact of the lift truck 143 and the reel and reel truck unit 73 thereon when they are moved onto the cradle 42 from either side thereof. Each buffer 153 is in the form of a hollow plunger slidably supported in a cylindrical chamber 154 and urged outwardly by a spring 155. A retaining sleeve 156 suitably fastened to the positioning block 74 within the cylindrical chamber slidably supports the plunger 153 and engages the flanged end 157 thereof to limit its outward movement to a predetermined normal position as shown in FIGS. 4 and 6.

The hollow plungers 153 and the chambers 154 in the block 145 form dash pots, the air trapped therein aiding the springs 155 to cushion the impact of the lift truck. Some of the compressed air may escape from the chambers 154 through vents 158 under control of adjustable needle valves 159.

It will be understood that when the reel and reel truck unit 73 is moved onto the cradle it is carried by the fork of the lift truck 143 with the horizontal reel truck frame plate 125 and the tapered end 77 of the shaft 78 disposed at an elevation above the positioning device 74 and the thrust bearing 75, and when the lift truck 143 has been stopped by the buffer 153 and the end of the positioning device 74, the lift truck is then actuated to lower the reel and reel truck unit 73 and cause the end 77 of the stub shaft 78 to be seated in the socket 76 of the thrust bearing 75 and the reel 40 to be supported thereby.

As the fork continues its downward movement, the reel truck 72 moves a limited distance therewith relative to the reel 40 until the frame plate 125 of the reel truck rests on the upper surfaces 148 of the positioning device 74. This downward movement of the reel truck relative to the reel, disengages the shoulder 132 of the truck hub 124 from the ball bearing 128 on the reel shaft 78 and transfers the downward thrust of the reel from the truck hub 124 to the thrust bearing 75 on the supporting member 74. The fork 142 continues its downward movement to disengage the pins 144 thereon from the reel truck 72 after which the lift truck 143 is withdrawn horizontally from the platform 47 of the cradle 42 onto the base 60. The reel-clamping mechanism 83 and the truck-clamping mechanism 93 are then actuated to clamp the reel 40 against the thrust bearing 75 of the supporting device 74 and the truck 72 against the supporting surfaces 148 of the supporting device 74.

With this design of the reel and reel truck unit 73 and the supporting device 74 therefor, it will be appreciated that when the reel and reel truck unit 73 is carried by the cradle 42, the reel 40 is supported by the positioning device 74 independent of the truck 72 and the downward thrust of the reel 40 and the radial thrust of the lower end thereof is taken by the thrust bearing 75 of the supporting device 74 and is transmitted thereto by the tapered end 77 of the shaft 78 of the reel 40.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a cable-stranding apparatus, a cable take-up device removably supported on the apparatus comprising a reel having an axially disposed shaft extending downwardly therefrom, and a truck having a bearing with a vertically disposed bore for slidably and rotatably receiving said shaft therein to support the reel for rotation about a vertical axis and at a predetermined normal elevation when said take-up device is removed from the apparatus and with the end portion of the shaft accessible to permit the application of a lifting force thereto to raise the reel slightly on the truck to remove the axial thrust of the reel from said bearing.

2. In a cable-stranding apparatus, a cradle, a cable take-up device removably supported on the cradle comprising a reel having an axially disposed shaft extending from one end thereof, and a truck having a bearing with a vertically disposed bore for slidably and rotatably receiving said shaft therein to support the reel for rotation about a vertical axis and at a predetermined normal elevation and with the end portion of the shaft accessible, means on the cradle engageable with the truck for supporting the truck in a predetermined position, and means on said truck supporting means engageable with the end of said shaft for supporting the reel in a raised position relative to said truck slightly above said normal elevation to remove the axial thrust of said reel from said bearing.

3. In a cable-stranding apparatus, a cradle, a reel, a truck for rotatably supporting said reel, said reel and said truck forming a reel and truck unit removably supported on the cradle and transportable thereto on the fork of a lift truck in which the fork has longitudinal portions and a transverse portion, and a supporting device mounted on said cradle for supporting the reel and reel truck unit in a predetermined position thereon, said supporting device having a plurality of rollers engageable with the longitudinal portions of the fork for guiding said lift truck along a predetermined path and having a member engageable with the transverse portion of the fork for stopping the lift truck with the reel and truck unit in said predetermined position on the cradle.

4. In a cable-stranding apparatus, a rotatable carrier, a reel and reel truck unit removably supported on the carrier and transportable to and from the carrier on the fork of a lift truck, a member on said carrier for supporting the reel and reel truck unit thereon is a predetermined position, said supporting member being engageable with the fork of the lift truck for guiding said lift truck along a predetermined path and for stopping the lift truck with the reel and reel truck unit in vertical alignment with said predetermined position, and a bumper yieldably mounted on the end of said supporting member for engaging the lift truck fork to cushion the impact thereof.

5. In a cable-stranding apparatus, a rotatable cradle, a cable take-up reel, a truck for rotatably supporting said reel, said reel and said truck forming a reel and truck unit removably supported on the cradle, said truck having a vertically disposed apertured bearing, said reel having a shaft slidably mounted in said apertured bearing and supported thereby for rotation about a vertical axis and in a predetermined normal position when said reel and truck unit is removed from the cradle, a supporting device on said cradle engageable with said truck for supporting said reel and truck unit thereon, bearing means mounted on said supporting device engageable with an end of said shaft for supporting said shaft and said reel for rotation about said vertical axis and in a raised position on said truck above said normal position to remove the weight of the reel from said bearing when said reel and truck unit is carried by said cradle.

6. In a cable stranding apparatus, a rotatable cradle, a cable take-up reel, a truck for rotatably supporting said reel, said reel and said truck forming a reel and truck unit removably supported on said cradle and transportable thereto on a lift vehicle, said reel having a downwardly directed shaft with a lower end portion, said truck having a vertically directed hub for supporting said shaft therein for vertical movement with said end portion of said shaft projecting below said hub and for supporting said reel for rotation about a vertical axis and at a predetermined normal elevation relative to said truck when said reel and truck unit is removed from said cradle, a member on said cradle for supporting said truck, a bearing mounted on said supporting member and having a socket for receiving said end portion of said shaft to support said shaft and said reel against radial movement and to support said reel for rotation and against axial movement in one direction and at an elevation relative to said truck which is slightly above said normal elevation to remove the weight of said reel from said truck when said reel and truck unit are carried by said cradle, and means on said cradle movable into engagement with the upper end of said reel for holding said reel against said bearing, said supporting member being shaped to engage the lift vehicle for guiding it along a predetermined path to aid in aligning said reel and truck unit with said bearing.

7. In a cable stranding apparatus, a cradle, a cable take-up reel having a downwardly directed shaft, a truck for rotatably supporting said reel, said reel and said truck forming a reel and truck unit removably supported on said cradle, said truck having a vertically directed bearing for guiding said shaft therein for vertical movement with the lower extremity of said shaft projecting therebelow and for supporting said reel for rotation about a vertical axis and at a predetermined normal vertical position relative to the truck when the reel and truck unit is removed from the cradle, means on said cradle for supporting said truck at a predetermined elevation, bearing means mounted on said cradle engageable with said lower extremity of said shaft for supporting said shaft and said reel against radial movement and for supporting said reel for rotation and against axial movement in one direction and in a vertical position relative to said truck which is slightly above said normal vertical position to remove the weight of said reel from said truck when said reel and truck unit is carried by said cradle, and means on said cradle movable into engagement with the upper end of said reel for supporting said reel against radial movement and against axial movement in the opposite direction.

8. In a cable stranding apparatus, a cradle, a take-up reel having a downwardly directed shaft with a tapered lower end portion, a truck for rotatably supporting said reel, said reel and said truck forming a reel and truck unit removably supported on said cradle, said truck having a vertically directed bearing for supporting said shaft therein for vertical movement with said tapered end portion of said shaft projecting therebelow and for supporting said reel for rotation about a vertical axis and at a normal position vertically relative to said truck when said reel and truck unit is removed from said cradle, a member on said cradle for supporting said truck, a second bearing rotatably mounted on said member for rotation about a vertical axis and against axial movement, said second bearing having a tapered socket for receiving said tapered end of said shaft to support said shaft and said reel against radial displacement and to support said reel for rotation and against axial movement in a downward direction and in a vertical position relative to said truck which is slightly above said normal vertical position to remove the weight of said reel from said truck when said reel and truck unit is carried by said cradle, and means on said cradle for engaging the upper end of said reel to support said reel for rotation and against axial movement upwardly.

References Cited in the file of this patent

UNITED STATES PATENTS

| | | |
|---|---|---|
| 1,882,902 | Reichelt | Oct. 18, 1932 |
| 2,229,787 | Abbott | Jan. 28, 1941 |
| 2,530,704 | Kemp | Nov. 21, 1950 |
| 2,793,820 | Torgeson | May 28, 1957 |
| 2,808,157 | Terrill | Oct. 1, 1957 |
| 2,903,842 | Gieseke | Sept. 15, 1959 |